United States Patent [19]

Cradduck et al.

[11] Patent Number: 5,055,088
[45] Date of Patent: Oct. 8, 1991

[54] SPRING BLADE CHAIN TENSIONER

[75] Inventors: Kevin M. Cradduck, Dryden; Nicholas A. Iacchetta, Cortland, both of N.Y.

[73] Assignee: Borg-Warner Automotive, Inc., Sterling Heights, Mich.

[21] Appl. No.: 535,446

[22] Filed: Jun. 8, 1990

[51] Int. Cl.⁵ .............................................. F16H 7/08
[52] U.S. Cl. .................................. 474/111; 474/135; 474/138; 474/140
[58] Field of Search ............... 474/111, 133, 140, 135, 474/138

[56] References Cited

U.S. PATENT DOCUMENTS

| 3,490,302 | 1/1970 | Turner et al. | 474/111 |
| 4,921,472 | 5/1990 | Young | 474/140 |

FOREIGN PATENT DOCUMENTS

| 55166 | 1/1980 | European Pat. Off. | 474/111 |
| 134054 | 8/1982 | Japan | 474/111 |
| 574748 | 1/1946 | United Kingdom | 474/111 |
| 986174 | 3/1965 | United Kingdom | |

Primary Examiner—Ramon S. Britts
Assistant Examiner—Roger J. Schoeppel
Attorney, Agent, or Firm—Gerald R. Black; Greg Dziegielewski

[57] ABSTRACT

While chain tensioners are used with chains on the engine of a motor vehicle, conventional blade spring configurations do not apply consistent forces throughout the life of the chain. The chain tensioner comprises two blade springs mechanically interlocked within a shoe, the shoe being adapted to contact the chain of the motor vehicle. The two blade springs each have a minimal form radius that is substantially smaller than the minimal form radius of a single blade spring, the single blade spring being otherwise identical to the two blade springs, and the thickness of the single blade spring being the same as the combined thickness of the two blade springs.

14 Claims, 2 Drawing Sheets

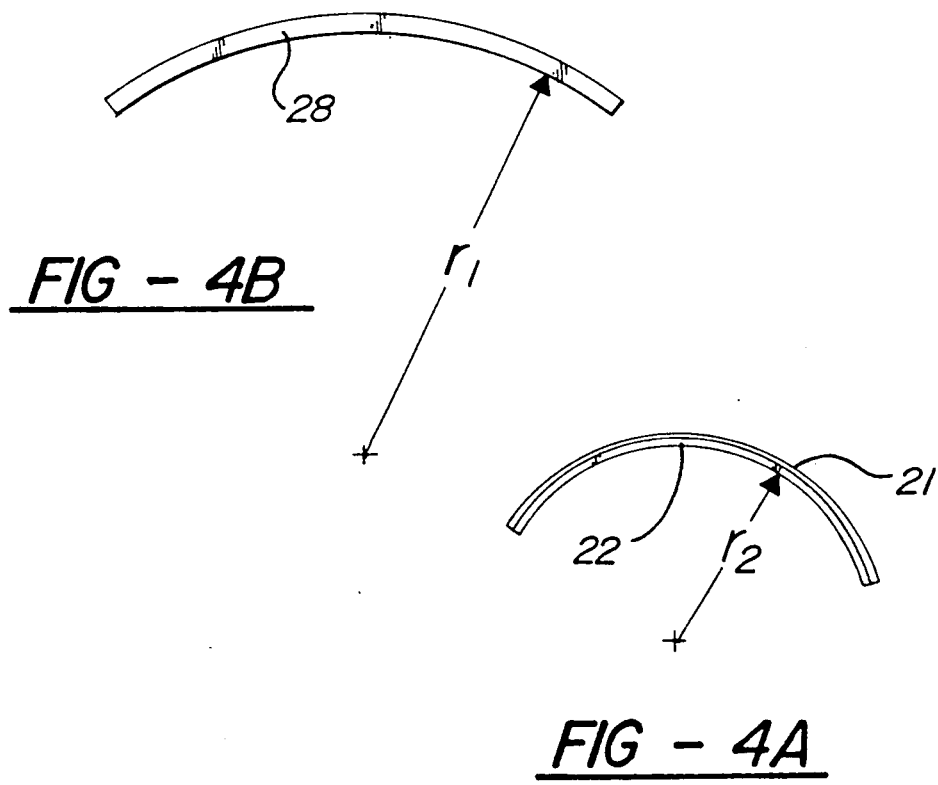
FIG - 4B
FIG - 4A
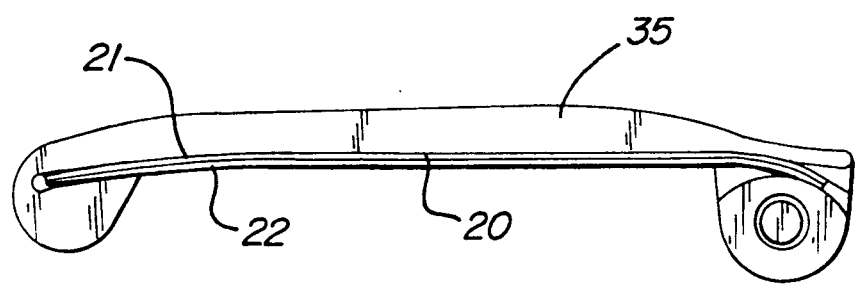
FIG - 5

SPRING BLADE CHAIN TENSIONER

TECHNICAL FIELD

This invention pertains to a blade spring configuration for use with a chain tensioner apparatus for cooperative engagement with a chain on the engine of a motor vehicle.

BACKGROUND ART

The conventional blade tensioner utilizing a spring blade in combination with a plastic shoe was invented by E. C. Turner and John Poyser as disclosed in U.S. Pat. No. 3,490,302. The shoe is made of a material that will creep under a load and at elevated temperature, such as a rigid filled nylon. The load is provided by the blade spring continuously bearing against the plastic shoe. The shoe has a recess at one end to receive the first end of the blade spring. The shoe includes a projection at the opposite end to pass through a matching hole at the second end of the blade spring, the blade spring and the shoe being mechanically engaged together by a split pin.

U.K. Patent #986,174 (Duncan) discloses a tensioner device for driving chains consisting of a known spring secured within a synthetic strip. The strip is made of nylon or synthetic rubber which creeps when subjected to a continuous load. The width of the chain is essentially the same as the width of the strip. The tensioning device comprises a strip having a sliding fulcrum end resting on a guide and a fixed fulcrum end adjacent to the driving sprocket. The tension spring extends between and is attached to the top ends of the strip.

U.S. Pat. No. 4,921,472 (Young) discloses an improvement over the Turner/Poyser design, the chain tensioner including a blade spring and a shoe, the mechanical interlock comprising a chamber at one end of the shoe and a shoulder disposed in a passageway in the other end of the shoe. The shoe design enables the blade spring to be assembled into the shoe secured and retained therein without a pin.

These blade type tensioners are limited to a very finite range of take-up capability. The chain elongates after prolonged use, resulting in the chain tensioner losing contact with the chain. Also, although these tensioner devices are capable of providing a high initial force, the force drops off considerably with the wear of the chain. The teachings of each of the above-identified patents are herein incorporated by reference as additional background to the present invention.

What is needed is a chain tensioner apparatus that will provide greater design flexibility of desired tensioner force, increased take-up capability, more consistent tensioner force throughout the working life of the chain, and improved damping characteristics.

DISCLOSURE OF THE INVENTION

The chain tensioner apparatus of the present invention comprises a blade spring means and a shoe. The shoe is preferably made of a plastic material that will creep under a continuous stress applied thereto by the blade spring means. The shoe also includes a mechanism to securely retain the blade spring means thereagainst.

The blade spring means preferably comprises a plurality of blade springs. Preferably only two blade springs are used that are substantially identical to each other.

These advantages and features of the chain tensioner apparatus of the present invention will be better understood by reference to the embodiments which are hereafter presented and depicted by way of example in the following description taken in conjunction with the accompanying drawings in which like reference numbers are used to indicate like elements.

BRIEF DESCRIPTION OF THE DRAWINGS

FIG. 4A is a side elevation of the two blade springs for the chain tensioner apparatus of the present invention;

FIG. 4B is a side elevation of a single blade spring of a conventional chain tensioner apparatus; and FIG. 5 is a side view of a second embodiment of a chain tensioner apparatus.

MODES FOR CARRYING OUT THE INVENTION

Figure 1:
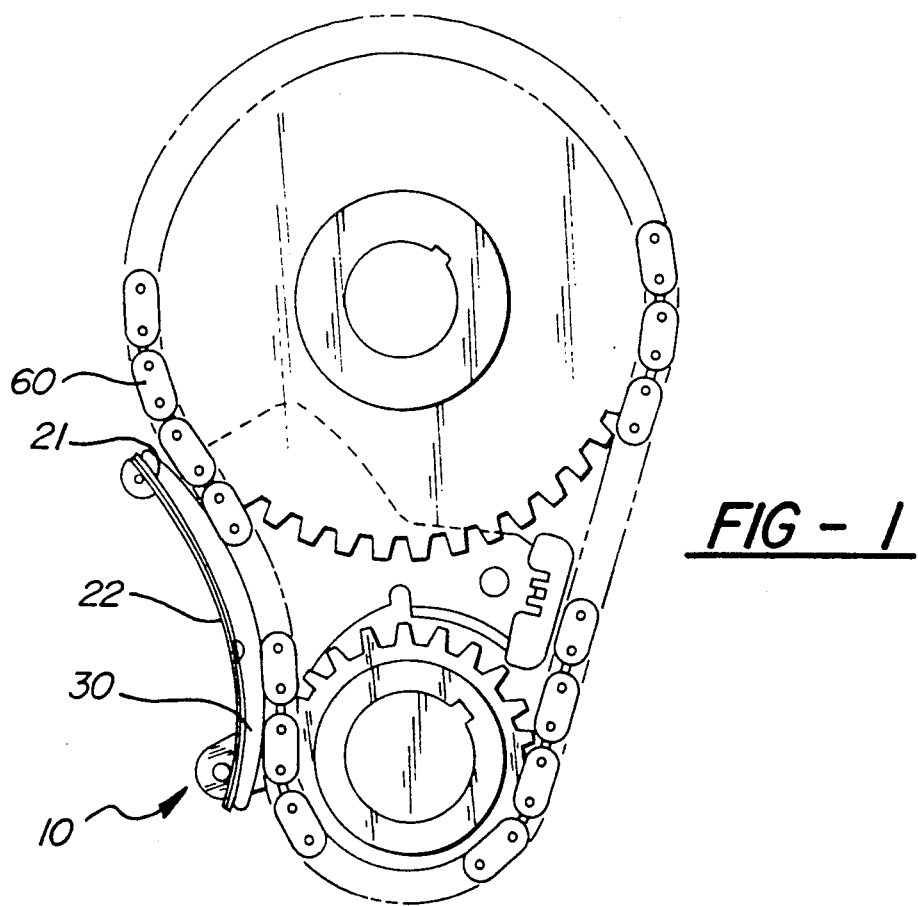
FIG. 1 is an environmental view depicting the preferred embodiment of the chain tensioner apparatus of the present invention being used to tension a chain.
Figure 2:
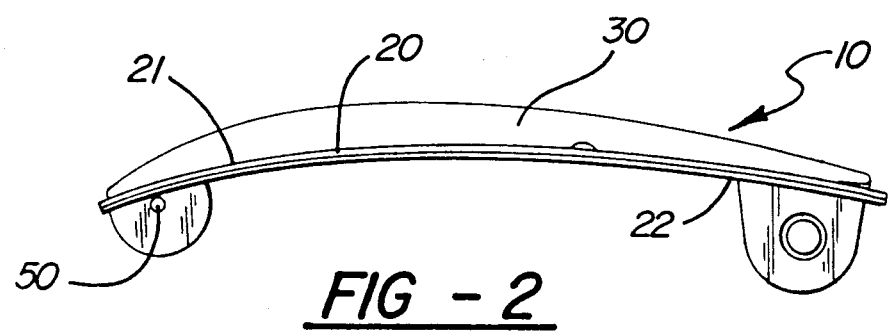
FIG. 2 is a side elevation of the embodiment of the chain tensioner apparatus depicted in FIG. 1.
Figure 3:
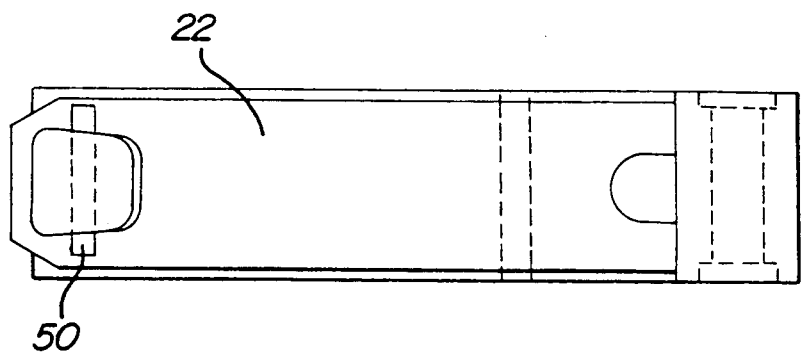
FIG. 3 is a bottom view of the chain tensioner apparatus depicted in FIG. 2.

Referring now to the drawings, FIG. 1 discloses an environmental view of the preferred embodiment of the chain tensioner apparatus [10] of the present invention positioned against a chain. The chain tensioner apparatus [10] of the present invention may be used in conjunction with various types of chain including but not limited to timing chains, transmission chains, and the like. The chain tensioner apparatus is further depicted in FIGS. 2 and 3 and comprises a blade spring means [20] and a shoe [30].

The shoe [30] is preferably made of a plastic material that will creep under a continuous load applied thereto by the blade spring means [20]. The plastic material is preferably heat stabilized nylon 6/6. The shoe [30] also includes a mechanism [50] to securely retain the blade spring means [20] thereagainst, such as a split pin or a solid pin.

The blade spring means [20] preferably comprises a plurality of blade springs [21 and 22]. Each of the individual blade springs [21 and 22] may be made of different materials, may have differing thicknesses, and may be subjected to any of a variety of different pretreatment processes to match the characteristics of the blade spring means [20] to the desired load sought to be applied against the chain drive [60]. However, preferably only two blade springs [21 and 22] are used that are substantially identical to each other.

Other blade spring means [20] also include any other configuration for mounting or otherwise utilizing one or more blade springs [21] which seek to optimize the spring forces and to maintain the optimal spring forces applied against the chain [60] throughout the life of the chain [60].

Multiple springs will provide greater design flexibility of the desired tensioner force, increased take-up capability, more consistent tensioner force throughout the working life of the timing chain [60], and improved damping characteristics. Two or more blade springs [21 and 22] can be used in conjunction with one another to produce the desired characteristics. Standard beam spring formulas are used to determine the desired geometry. Stress levels are directly proportional to material thickness and deflection. Therefore, blade springs of thinner material can be deflected a greater amount for the same stress level as thicker blade springs. This allows the thinner material to be formed to a smaller initial radius and stay within allowable stress limits when the blade springs [21 and 22] are assembled into the shoe [30].

The desired tensioning force can be obtained by using a plurality of blade springs [21 and 22]. As the chain [60] wears and the spring radii decrease, the tensioning force will drop. However, for a given amount of wear a much smaller percentage of the initial minimal form radius is used as compared with a single spring of greater thickness. Accordingly, the force applied by the blade spring means [20] remains relatively uniform throughout the life of the chain [60].

The plastic shoe [30] is preferably molded straight or with very little curvature to allow for ease of assembly in the engine. Therefore, the blade springs [21 and 22] must be deflected from their natural curve to straight for mechanical assembly with the shoe. As the blade springs [21 and 22] are straightened, internal stress levels increase. Caution must be used in designing the blade springs [21 and 22] to allow for straightening without exceeding allowable stress limits. This, then becomes the limiting factor in tensioning force and take-up capability.

b is the width of the spring (inches)
t is the spring thickness (inches)
L is the length of the spring (inches)

For the heat stabilized nylon 6/6, E is about 30,000,000.

All of the blade springs are less than 0.040 inches thick, to ensure a slip fit with the tensioner face of the shoe. The inside radius of each of the blade springs forms an arc of 180 degrees or less. Also, care must be taken not to exceed the blade spring deformation stresses during the assembly of the chain tensioner apparatus, which is generally about 276,000 PSI for SAE 1075 spring steel. If more than the spring deformation stress is applied, the spring will not return to the initial minimal form radius. The "minimal form radius" as used herein is the radius of the blade spring that is limited by the maximum allowable stress for the material as defined by the following formula:

$$S = \frac{6EFt}{L^2}$$

wherein
S is the spring stress (pounds/square inch)
E is the modulus of the material
F is the deflection of the spring (inches)
t is the spring thickness (inches)
L is the length of the spring (inches)

TABLE 1

| THICKNESS (inches) | MINIMAL FORM RADIUS (inches) | # OF BLADES USED | ASSEMBLY RADIUS AFTER SOAKING @225° F. (inches) | THEORETICAL SPRING FORCE ON CHAIN | |
|---|---|---|---|---|---|
| | | | | NEW | 1.0% WORN |
| 0.025 | 1.81 | 1 | 2.53 | 16.6 | 10.0 |
| 0.030 | 2.20 | 1 | N/A | 22.1 | 9.5 |
| 0.036 | 2.20 | 1 | N/A | 25.7 | 1.2 |
| 0.040 | 3.10 | 1 | N/A | 29.1 | — |

As is shown by TABLE 1 and TABLE 2, it is possible to determine the geometry of multiple blade springs that provide a substantial increase in take-up capability and maintain a relatively constant force on the chain.

As shown in TABLE 1, for a blade spring having a thickness of 0.040 inches, the chain tensioner apparatus [10] will be unable to take up the slack of the chain [60] when the chain [60] is one percent worn.

TABLE 2

| THICKNESS (inches) | MINIMAL FORM RADIUS (inches) | # OF BLADES USED | ASSEMBLY RADIUS AFTER SOAKING @225° F. (inches) | THEORETICAL SPRING FORCE ON CHAIN | |
|---|---|---|---|---|---|
| | | | | NEW | 1.0% WORN |
| 0.015 | 1.03 | 2 | 1.98 | 11.5 | 9.6 |
| 0.018 | 1.03 | 2 | 1.48 | 19.9 | 16.6 |
| 0.020 | 1.30 | 2 | 1.67 | 23.6 | 18.4 |

The blade springs in these tables are each 0.875 inches wide and 4.06 inches long. The blade springs are SAE 1075 steel, scaleless, blue-black temper.

The following formula has been used to calculate the spring forces in TABLE 1 and TABLE 2:

$$P = \frac{4EFbt^3}{L^3}$$

wherein
P is the spring force (pounds)
E is the modulus of the material
F is the deflection of the spring (inches)

For purposes of comparison, a conventional chain tensioner apparatus uses a blade spring having a thickness of 0.025 inches. In the preferred embodiment of the present invention, the single blade spring is replaced with two blade springs [21 and 22] each having a thickness of 0.018 inches. Considerable improvement results in the theoretical spring force applied to the chain after one percent wear. The conventional blade spring supplies a force of 10 pounds, whereas the two blade springs combined provide a force of 16.6 pounds, an increase in the applied force of about 66 percent. Also, the single blade spring (0.025 inches thick) has a minimal form radius of 2.53 inches after soaking for one hour in a hot oil bath, whereas the two blade springs (each being 0.018 inches thick) have a minimal form radius after soaking of 1.48 inches, an improvement in take-up as measured from flat of about 41 percent. In addition, the two blade springs [21 and 22] still maintain over 80 percent of the initial force to the worn chain [60], as compared with only about 60 percent for the conventional single blade spring.

FIG. 4B discloses a simplified view of a single blade spring [28] of a given thickness, having a minimal form radius $r_1$. FIG. 4A discloses a simplified view of the two blade springs [21 and 22] as used in the chain tensioner apparatus [10] of the present invention, the combined thickness of the two blade springs [21 and 22] being equivalent to the given thickness of the single blade spring [28]. The minimal form radius $r_2$ of the two blade springs [21 and 22] is considerably smaller than the minimal form radius $r_1$ of the single blade spring [28]. As shown in TABLE 1 and TABLE 2, the minimal form radius $r_1$ for a single blade spring [28] of 0.030 thickness is 2.20 inches, whereas the minimal form radius $r_2$ of the two blade springs [21 and 22] having the same thickness (each blade being 0.015 inches thick) is 1.03 inches.

FIG. 5 discloses the teaching of the present invention as applied to the shoe [35] depicted in U.S. Pat. No. 4,921,472. To insert more than one blade spring into this shoe [35], essentially the same general technique is used as disclosed in the referenced patent, except that the blade springs [21 and 22] are inserted into the shoe [35] simultaneously.

Ideally, a chain tensioner apparatus should provide adequate force to control the motion of the chain [60] without over tensioning. The apparatus should also maintain a consistent force throughout the life of the chain [60]. By nature of design, this type of chain tensioner will have its highest force when the blade is near straight and in contact with a new chain drive. As the chain system wears the shoe will creep allowing the blade spring to decrease in radius. As this happens, the force exerted by the blade spring will continue to decrease until equilibrium is reached between the plastic modulus and the blade spring force.

An additional benefit of the utilization of multiple blade springs [21 and 22] is an improvement in natural damping characteristics. The second blade spring [22] adds another set of mating surfaces. As the chain tensioner apparatus [10] flexes, the friction between all mating surfaces will provide damping to the system.

While certain embodiments of the chain tensioner apparatus of the present invention have been presented, it is appreciated that the invention is not limited thereto. Many variations, substitutions, and amendments can be made to these embodiments without departing from the scope of the invention. Such variations, substitutions, and amendments as would be apparent to one having ordinary skill in the art who would be familiar with the teachings disclosed herein are also deemed to fall within the scope and the spirit of the present invention as hereinafter claimed.

We claim:

1. An apparatus for applying a continuous tension to a chain, the apparatus comprising:
   (a) a first blade spring and a second blade spring; and
   (b) a shoe adapted to contact the chain, the shoe being made of a material that will creep under continuous load applied thereto by the first and second blade springs, the shoe having means for retaining the first and second blade springs therewithin, the first and second blade springs causing the shoe to bend.

2. The apparatus of claim 1, wherein the first and the second blade springs are each made of the first material, the first and second blade springs being each subjected to a first pretreatment, the first and the second blade springs combined having a first thickness, the first blade spring and the second blade spring contacting each other along a common surface.

3. The apparatus of claim 2, wherein the first and second blade springs combined have a minimal form radius that is smaller than the minimal form radius of a single blade spring, the single blade spring being made of the first material, the single blade spring having the first thickness, and the single blade spring being subjected to the first pretreatment.

4. The apparatus of claim 2, wherein the chain tensioning apparatus applies a tensioning force to the chain after the chain is worn one-percent that is greater than the tensioning force applied to the chain after the chain is worn one-percent by a chain tensioning apparatus with a single blade spring, the single blade spring being made of the first material, the single blade spring having the first thickness, the single blade spring being subjected to the first pretreatment.

5. An apparatus for applying a continuous tension to a chain during the lifetime of the chain as the chain wears, the apparatus comprising:
   (a) a first blade spring in combination with a second blade spring, the first and second balde springs each being made of a first material and having a first combined thickness and each undergoing a first pretreatment, the first and second blade springs enabling the apparatus to apply a tensioning force to the chain after the chain is worn one-percent that is greater than the tensioning force applied to the chain after the chain is worn one-percent by a chain tensioner apparatus having a single blade spring made of the first material and having the first combined thickness and undergoing the first pretreatment; and
   (b) a shoe adapted to contact the chain, the shoe being made of a material that will creep under a continuous stress applied thereto by the first and second blade springs, the shoe including means for retaining the first and second blade springs therewithin.

6. The apparatus of claim 5, wherein the first blade spring and the second blade spring contact each other along a common surface.

7. The apparatus of claim 5, wherein the first and second blade springs combined have a minimal form radius that is smaller than the minimal form radius of the single blade spring.

8. The apparatus of claim 5, wherein the first blade spring is substantially identical to the second blade spring.

9. An apparatus for applying a continuous tension to a chain, the apparatus comprising:
   (a) a first blade spring combined with a second blade spring, the first and second blade springs each being made of a first material and having a first combined thickness and each undergoing a first pretreatment, the first blade spring combined with the second blade spring having a minimal form radius that is smaller than the minimal form radius of a single blade spring made of the first material and having the first combined thickness and undergoing the first pretreatment; and
   (b) a shoe adapted to contact the chain, the shoe being made of a material that will creep under continuous stress applied thereto by the first and second blade springs, the shoe including means for retaining the first and second blade springs therewithin.

10. The apparatus of claim 9, wherein the first blade spring and the second blade spring contact each other along a common surface.

11. The apparatus of claim 9, wherein the first blade spring has a thickness that is different than the thickness of the second blade spring.

12. The apparatus of claim 9, wherein the first blade spring has a first minimal form radius and the second blade spring has a second minimal form radius, the first minimal form radius being different than the second minimal form radius.

13. The apparatus of claim 9, wherein the first blade spring is substantially identical to the second blade spring.

14. The apparatus of claim 9, wherein the tensioning apparatus having the fist and second blade spring applies a tensioning force to the chain after the chain is worn one-percent that is greater than the tensioning force applied to the chain after the chain is worn one-percent by the tensioning apparatus having the single blade spring.

* * * * *